Patented June 25, 1946

2,402,586

UNITED STATES PATENT OFFICE 2,402,586

CHEMICAL PROCESSES

Alfonso M. Alvarado, Wilmington, Del., assignor to E. I. du Pont de Nemours & Company, Wilmington, Del., a corporation of Delaware No Drawing. Application February 3, 1942, Serial No. 429,401

11 Claims. (Cl. 260—609)

This invention relates to a chemical process and, more particularly, it relates to an improved process for the production of thiols from ethylenic compounds and hydrogen sulfide.

Organic sulfur compounds have become of considerable industrial importance and methods for obtaining them economically from readily available raw materials are of considerable utility. Among the organic sulfur compounds, thiols are of special interest because of their highly reactive nature. It has been proposed to prepare thiols by the reaction of olefins with hydrogen sulfide but, in general, this reaction leads to the formation of only a small proportion of thiol, the principal product being usually an organic sulfide. To overcome this difficulty it has also been proposed to employ a large excess of hydrogen sulfide over the amount theoretically required. While this expedient may be partially successful, it curtails the capacity of the producing equipment and usually necessitates recovery of the unconverted reactants. Under such conditions the conversion to thiols may be considerably limited and the economy of the process will suffer accordingly. It is evident that a simple means of suppressing the formation of sulfides during the reaction of ethylenic compounds with hydrogen sulfide and which will give high conversions to thiols is to be desired and would constitute an important advance in the art.

This invention, accordingly, has as its object an economical process for obtaining thiols. Another object is the preparation of thiols from ethylenic compounds in high yields. Still another object is the preparation of thiols from ethylenic compounds by a method which will avoid to a considerable extent the formation of by-products. Other objects will be apparent from the following description of the invention.

These objects are accomplished by the following invention which comprises heating in the liquid phase an ethylenic compound containing as the only unsaturation carbon-to-carbon multiple bonds, in contact with hydrogen sulfide, hydrogen, and a metal sulfide catalyst.

In practicing this invention an ethylenic compound such as an olefin and an equivalent amount of hydrogen sulfide are charged into an autoclave together with a metal sulfide catalyst such as cobalt sulfide. In certain cases as discussed below it may be preferable to employ an inert solvent. Hydrogen is then introduced into the autoclave. The reaction mixture is then agitated and heated to 150° to 200° C. until the reaction is substantially complete. This point is indicated when there is no further decrease in the pressure of the system. The crude reaction mixture is then cooled and filtered to separate the metal sulfide catalyst. The thiol thus produced may be isolated and purified by the usual methods of distillation, crystallization, or solvent extraction. The following examples show in greater detail the practice of this invention. In the examples amounts are given as parts by weight unless otherwise specified.

Example I

One hundred twelve parts of distilled octene-1 and 34 parts of hydrogen sulfide are charged into an autoclave together with 10 parts of cobalt trisulfide catalyst prepared by precipitating an aqueous cobalt chloride solution with an equivalent amount of sodium trisulfide solution. The autoclave is then charged with hydrogen to a pressure of 1000 lbs./sq. in. and sealed. The reaction mixture is then agitated and heated at 200° C. for 7 hours. After this time the autoclave is cooled, the residual gases vented, and the liquid product filtered to separate the catalyst. The colorless filtrate is then fractionally distilled, and there are isolated 25 parts of octene, 85 parts of octanethiol, and 16 parts of octyl sulfide. The conversion of octene to octanethiol is 58% and the yield, based on unrecovered octene is 75% of the theoretical. The conversion of octene to dioctyl sulfide is only 8%. That the presence of hydrogen effectively suppresses the formation of octyl sulfide and increases the formation of octanethiol is shown clearly by comparison with the following experiment.

Octene-1, hydrogen sulfide and cobalt trisulfide catalyst are charged into an autoclave. The same amounts of reactants and the same conditions and procedure are adopted as in the previous experiment except that no hydrogen is added. On working up the product, as described above, there are obtained 10 parts of octene, 52 parts of octanethiol, and 60 parts of octyl sulfide. The conversion of octene to octanethiol is only 35%, and the yield is 39%. On the other hand, the conversion of octene to octyl sulfide is 25% and the yield is 55%.

Similarly, the yield of octanethiol is low and the production of octyl sulfide is high when nitrogen is substituted for the hydrogen.

Example II

One hundred twelve parts of distilled octene-1 in 32 parts of sulfur are charged into an autoclave together with 8 parts of cobalt trisulfide catalyst. The autoclave is then charged with hydrogen to a pressure of 1000 lbs./sq. in., sealed, stirred and heated at 125° C. for one hour. During this time there is a rapid hydrogen absorption, and additional hydrogen is added from time to time to replace that absorbed. This stage in the reaction corresponds to the conversion of the sulfur to hydrogen sulfide by catalytic hydrogenation. Thereafter the temperature of the autoclave is raised to 200° C. and the pressure increased to 1800 lbs./sq. in. at 200° C. by the addition of hydrogen and the autoclave is heated and agitated for 6 hours. After cooling the autoclave, venting the residual gases, and filtering the liquid product from the catalyst, the crude reaction mixture is fractionally distilled. There are isolated 21 parts of octene, 85 parts of octanethiol, and 23 parts of octyl sulfide. The yield of octanethiol is 72% of the theoretical, based on the unrecovered octene.

*Example III*

One hundred thirty-six parts of distilled alpha-pinene, 32 parts of sulfur, and 8 parts of cobalt trisulfide catalyst are charged into an autoclave together with hydrogen to an initial pressure of 1000 lbs./sq. in. The autoclave is then sealed and heated at 125° C. until the sulfur is converted to hydrogen sulfide. Additional hydrogen is added as required to maintain the pressure above 1000 lbs./sq. in. Thereafter the autoclave is heated at 200° C. for 6 hours. The reaction mixture is worked up as described in the preceding examples and there are obtained 41 parts of pinene, 100 parts of pinanethiol, and 10 parts of pinyl sulfide. The conversion of pinene to pinanethiol is 59% and the yield of pinanethiol is 84%. Only a small proportion of sulfide is produced.

The beneficial effect of hydrogen on the production of thiols is shown by comparison with the following experiment in which no hydrogen is employed. One hundred thirty-six parts of distilled alpha-pinene, 34 parts of hydrogen sulfide, and 8 parts of reduced cobalt sulfide catalyst are charged into an autoclave. Nitrogen is introduced to an initial pressure of 1000 lbs./sq. in. and the autoclave is sealed, agitated and heated at 200° C. for 7 hours. The reaction mixture is worked up as described in the preceding paragraph and there are obtained 50 parts of pinene, 12 parts of pinanethiol and 83 parts of the corresponding sulfide. The conversion of pinene to thiol is only 10%.

*Example IV*

Fifty-eight parts of allyl alcohol and 32 parts of sulfur are charged into an autoclave together with 5 parts of cobalt sulfide catalyst and 100 parts of dioxane solvent. The contents of the autoclave are stirred and heated at 125° C. and 1500 lbs./sq. in. hydrogen pressure for one-half hour while the sulfur is converted to hydrogen sulfide. The temperature is then raised to 175° C. under a total pressure of 2000 lbs./sq. in. and held there for 5 hours. After cooling the reaction mixture, the catalyst is separated by filtration and the unreacted hydrogen sulfide is removed by blowing the solution with nitrogen. By fractional distillation the solvent is separated from the reaction products which consist of mercaptopropanol and its higher-boiling condensation products, the latter also containing mercapto groups.

*Example V*

One hundred parts of octene-1, 32 parts of sulfur, and 15 parts of cobalt sulfide catalyst are agitated and heated in a small autoclave at 150° C. and 1000 to 2000 lbs./sq. in. of hydrogen pressure for one-half hour or until the sulfur is hydrogenated to hydrogen sulfide. Thereafter the temperature is raised to 250° C. and held there for 6.5 hours at a total pressure of 2000 lbs./sq. in. On working up the reaction mixture as described in the preceding examples, octanethiol is obtained in high yield, together with only minor amounts of octyl sulfide.

The above examples serve to illustrate the principal features of the invention. The starting materials and the conditions of temperature, catalyst, reaction time, etc., are, however, subject to considerable variation within the scope of this invention. In its broader aspects, the invention includes the production of thiols from ethylenic compounds of the type which contain as the only unsaturated groups those comprising carbon-to-carbon multiple bonds. Ethylenic compounds containing other types of unsaturated groups such as carbonyl, carboxyl and nitrile groups undergo complicated side reactions under the conditions employed due to the reactive nature of such unsaturated groups toward hydrogen sulfide and thiols. The practice of this invention has been illustrated using as starting materials octene and pinene. Thiols may be produced, likewise from other olefinic hydrocarbons such as the gaseous olefins, ethylene, propylene, butenes, and also from the normally liquid olefinic hydrocarbons such as the pentenes, hexenes, octenes, cetene and unsaturated polymers. Thiols may similarly be prepared by the process of this invention starting from doubly unsaturated compounds as for example vinylacetylene, butadiene, divinylacetylene and cyclohexadiene. Examples of other olefinic hydrocarbons that may be employed for preparing thiols by this process include cyclic olefins such as cyclohexene, styrene, dihydronaphthalene and unsaturated terpenes. The process of this invention is also applicable to the production of thiols from ethylenic compounds containing functional groups that are unreactive under the conditions employed such as the hydroxyl, amino, halogen, thiol, sulfide and ether groups. Examples of such starting materials are vinyl chloride, allyl alcohol, allylamine, allyl sulfide, butene-2-thiol-1, 2-methylpentene-2-thiol-4, ethyl vinyl sulfide, chloroprene and its polymers.

When the ethylenic compound is not a liquid under the reaction conditions, it is preferred to employ an inert solvent medium. Examples of suitable solvents are saturated hydrocarbons such as petroleum ether and petroleum fractions; aromatic hydrocarbons such as benzene. Other solvents that may be employed are ethers such as diethyl ether, dioxane; alcohols such as methanol, ethanol, butanol; and chlorinated paraffins.

The proportions of hydrogen sulfide and ethylenic compound employed in the practice of this invention may be varied over considerable limits but it is of course preferred to have at least one equivalent of hydrogen sulfide for each equivalent of ethylenic compound. A moderate excess of hydrogen sulfide over the theoretical amount required is sometimes desirable in assisting the reaction to completion. A large excess of hydrogen sulfide is usually not essential.

Instead of charging hydrogen sulfide into the reaction vessel, it is frequently more convenient to employ an equivalent amount of elementary sulfur as shown in Examples II, III and IV. In the presence of hydrogen and the metal sulfide catalyst the elementary sulfur will be rapidly hydrogenated to hydrogen sulfide at temperatures of 100° C. and above and thus serves as a convenient source of hydrogen sulfide for the subsequent reaction.

The proportion of hydrogen to be employed may likewise be varied over a considerable range. It is preferred to employ an amount of hydrogen that will have a partial pressure in the reaction system of at least 100 and preferably 500 lbs./sq. in., but any greater amount can be employed with equally beneficial effects.

The reaction between ethylenic compounds and hydrogen sulfide in the presence of hydrogen is promoted by metal sulfide catalysts. Generally, the heavy metal sulfides are suitable, especially those comprising the sulfides and polysulfides of metals of group VI and VIII of the periodic table. Examples of catalyst compositions which are particularly efficient are the sulfides of cobalt, nickel, iron, molybdenum, tungsten and chromium. Suitable catalysts can be prepared according to the methods described in the copending applications of F. K. Signaigo, Serial No. 319,241, filed February 16, 1940, and Serial No. 319,242, filed February 16, 1940, and that of B. W. Howk, Serial No. 353,936, filed August 23, 1940. For example, efficient catalysts can be produced by precipitation methods in which a soluble salt of a metal such as cobalt is treated with a solution of sodium or ammonium polysulfide. Particularly active catalysts are obtained by treating a pyrophoric hydrogenating metal with a sulfiding agent such as hydrogen sulfide, sulfur, or organic compounds of bivalent sulfur at moderate temperatures. The latter process may be carried out conveniently in situ by charging the free metal, together with the ethylenic compound and hydrogen sulfide. The former will react with the hydrogen sulfide with the formation of an active metal sulfide. Generally an amount of catalyst corresponding to 1 to 15% by weight of the ethylenic compound charged will be sufficient to bring about reaction at a suitable rate.

With simple ethylenic compounds it is preferred to carry out the reaction with hydrogen sulfide in the presence of hydrogen at a temperature within the range of about 150° to 250° C. since under these conditions the reaction occurs at a satisfactory rate. However, it will be readily understood by those skilled in the art that if the ethylenic compound or the product is thermally unstable it is preferred to operate at a lower temperature of the order of 50° to 150° C. in order to avoid undue decomposition reactions, even though a longer reaction time is required. In the case of ethylenic compounds having especially reactive unsaturated groups such as conjugated dienes and the like, the lower temperatures may be employed with beneficial results. On the other hand, where the materials involved are quite stable, it may be convenient to operate at temperatures in the range from 250° to 300° C. in order to obtain a rapid conversion.

In the practice of this invention, the preferred mode of operation involves heating the reactants together in a sealed reaction vessel. The pressure will then depend upon the vapor pressure of the reactants and solvent and on the amount of hydrogen charged. Generally, such operating pressures will be in the range from 500 to 5000 lbs./sq. in.

This invention constitutes a novel, useful, and economical process for preparing thiols which are of considerable value as chemical intermediates, particularly for the preparation of surface active agents, pesticides, therapeutic agents, plastics and rubber and petroleum chemicals.

As many apparently widely different embodiments of this invention may be made without departing from the spirit and scope thereof, it is to be understood that this invention is not to be limited to the specific embodiments shown and described.

I claim:

1. The process for the production of thiols which comprises heating in the liquid phase an ethylenic compound containing as the only unsaturation carbon-to-carbon multiple bonds, in contact with hydrogen sulfide, hydrogen, and a metal sulfide catalyst.

2. The process of claim 1 characterized in that the ethylenic compound is an olefin.

3. The process of claim 1 characterized in that the ethylenic compound is an open chain olefin.

4. The process of claim 1 characterized in that the ethylenic compound is octene.

5. The process of claim 1 characterized in that the ethylenic compound is allyl alcohol.

6. The process of claim 1 characterized in that the catalyst is a sulfide selected from the group consisting of the sulfides of iron, nickel, cobalt, molybdenum and chromium.

7. The process for the production of thiols comprising heating together in the liquid phase an ethylenic compound containing as the only unsaturation carbon-to-carbon multiple bonds, sulfur, hydrogen, and a metal sulfide catalyst.

8. The process for the production of thiols which comprises heating in the liquid phase a cyclic olefin in contact with hydrogen sulfide, hydrogen, and a metal sulfide catalyst.

9. The process of claim 8 in which the cyclic olefin is pinene.

10. The process of claim 1 characterized in that the mixture of ethylenic compound, hydrogen sulfide, hydrogen, and metal sulfide catalyst is subjected to a pressure greater than atmospheric pressure.

11. The process of claim 1 characterized in that the hydrogen has a partial pressure of at least 100 pounds per square inch.

ALFONSO M. ALVARADO.